(12) United States Patent
Tsukamoto et al.

(10) Patent No.: US 10,281,040 B2
(45) Date of Patent: May 7, 2019

(54) CONTROLLER FOR VEHICLE

(71) Applicant: TOYOTA JIDOSHA KABUSHIKI KAISHA, Toyota-shi, Aichi-ken (JP)

(72) Inventors: Norihiro Tsukamoto, Toyota (JP); Tomohiro Asami, Nisshin (JP); Keisuke Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 15/653,344

(22) Filed: Jul. 18, 2017

(65) Prior Publication Data
US 2018/0031126 A1 Feb. 1, 2018

(30) Foreign Application Priority Data

Jul. 26, 2016 (JP) .................................. 2016-146681

(51) Int. Cl.
| | |
|---|---|
| *F16H 61/12* | (2010.01) |
| *F16H 63/50* | (2006.01) |
| *F02D 41/02* | (2006.01) |
| *F16H 61/06* | (2006.01) |
| *F16H 61/686* | (2006.01) |

(52) U.S. Cl.
CPC ......... *F16H 63/502* (2013.01); *F02D 41/023* (2013.01); *F02D 41/0225* (2013.01); *F16H 61/061* (2013.01); *F16H 61/686* (2013.01); *F16H 2061/124* (2013.01)

(58) Field of Classification Search
CPC .... F16H 63/502; F16H 61/686; F16H 61/061; F16H 2061/124; F02D 41/023; F02D 41/0225

See application file for complete search history.

(56) References Cited

U.S. PATENT DOCUMENTS

| | | | |
|---|---|---|---|
| 2011/0029207 A1 | 2/2011 | Sasahara et al. | |
| 2015/0337952 A1* | 11/2015 | Cho ...................... | B60W 10/10 701/54 |
| 2017/0072934 A1* | 3/2017 | Tsuda ...................... | F02D 29/02 |
| 2017/0129490 A1* | 5/2017 | Kuwahara ............... | F16H 3/663 |
| 2017/0225683 A1* | 8/2017 | Jiang ...................... | B60W 30/18 |

FOREIGN PATENT DOCUMENTS

JP 2011-027210 A 2/2011

* cited by examiner

*Primary Examiner* — David J Hlavka
(74) *Attorney, Agent, or Firm* — Oliff PLC

(57) ABSTRACT

When an engagement-side clutch taking charge of rotation control in a downshift is the same as a rotation control clutch in the previous gear shift or a clutch of which the engagement has been switched in the previous gear shift, there is a likelihood that clutch hydraulic controllability will decrease and the clutch hydraulic controllability is secured by delaying start of the gear shift. It is possible to execute a gear shift which is a downshift without unnecessary waiting by setting a delay time by which the start of the gear shift is delayed depending on an accelerator depression amount such that the delay time is shorter when the accelerator depression amount is small than when the accelerator depression amount is large.

3 Claims, 7 Drawing Sheets

FIG. 3

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

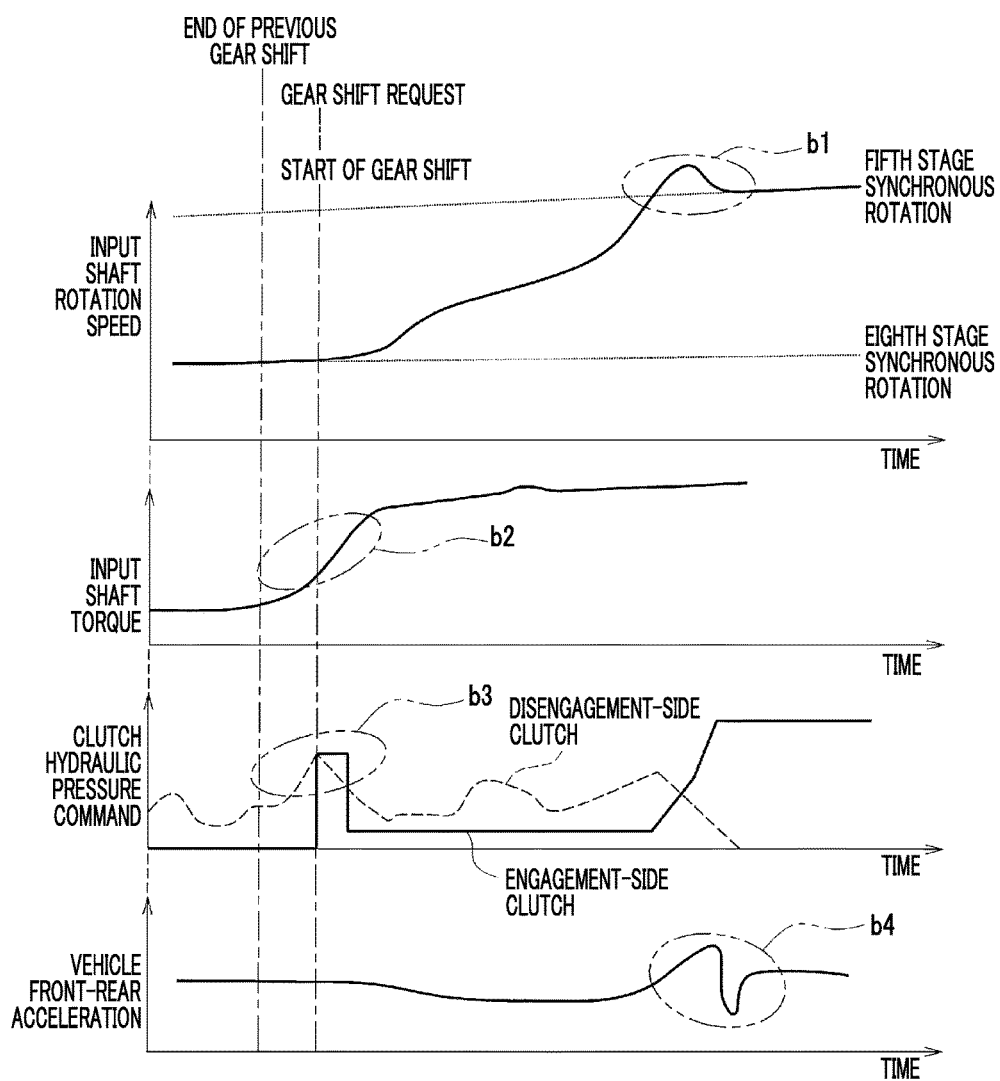

CONTROLLER FOR VEHICLE

CROSS-REFERENCE TO RELATED APPLICATIONS

This application claims priority to Japanese Patent Application No. 2016-146681 filed on Jul. 26, 2016, which is incorporated herein by reference in its entirety.

BACKGROUND

1. Technical Field

The disclosure relates to a controller for a vehicle including an engine and a stepped type transmission.

2. Description of Related Art

A technique of considering a thermal load on a frictional engagement element and the like in a stepped type transmission including a plurality of frictional engagement elements is described in Japanese Patent Application Publication No. 2011-27210 (JP 2011-27210 A).

In the technique described in JP 2011-27210 A, whether to allow the frictional engagement elements to engage is determined based on a temperature and a differential rotation of the frictional engagement elements and a pattern of a gear shift command (such as an upshift, a downshift of one step, a downshift of two or more steps, or a sequential downshift of two or more steps), and the engagement is delayed until it is determined that the engagement is possible when it is determined that the engagement is not possible. The temperature and the differential rotation of the frictional engagement elements are normally calculated and the engagement is determined as not being possible to delay when there is concern about burnout of the frictional engagement elements based on a combination with a pattern of a gear shift command.

SUMMARY

In the technique described in JP 2011-27210 A, a gear shift is delayed by determining whether to engage in consideration only a thermal load of the frictional engagement elements. Accordingly, when a delay time is excessively long, there is concern about a decrease in drivability due to hesitation.

The disclosure is made in consideration of such circumstances and provides a controller that can minimize a decrease in drivability due to hesitation while securing hydraulic controllability of frictional engagement elements at the time of a downshift of a transmission in a vehicle including a transmission including a plurality of frictional engagement elements.

According to an aspect of the disclosure, there is provided a controller for a vehicle, the vehicle including an engine, a plurality of frictional engagement elements, and a transmission which is a stepped type and of which a gear shift is executed by switch of engagement of the plurality of frictional engagement elements. The controller includes an electronic control unit. The electronic control unit is configured to: when the gear shift of the transmission is a downshift and the frictional engagement element taking charge of rotation control in the gear shift which is a downshift is the same as the frictional engagement element having taken charge of the rotation control in the previous gear shift or the frictional engagement element of which the engagement has been switched in the previous gear shift, (i) set a predetermined delay time depending on an accelerator depression amount; and (ii) start the gear shift after the predetermined delay time elapses after a gear shift start request of the downshift.

In the controller for a vehicle, the electronic control unit may be configured to set the predetermined delay time to be shorter when a torque to an input shaft of the transmission during the downshift is small than when the torque to the input shaft is large.

In the controller for a vehicle, the electronic control unit may be configured to, when the gear shift of the transmission is the downshift and the frictional engagement element taking charge of the rotation control in the gear shift which is a downshift is not the same as the frictional engagement element having taken charge of the rotation control in the previous gear shift or the frictional engagement element of which the engagement has been switched in the previous gear shift, start the gear shift immediately without waiting for a delay time from a gear shift start request for the downshift.

When a gear shift which is a downshift is started under an influence of hydraulic control of the frictional engagement elements in the previous gear shift, hydraulic controllability of the frictional engagement elements which are used in the gear shift decreases. When the gear shift is a downshift due to accelerator depression and the gear shift which is a downshift is started in a state in which a transmission input shaft torque is unstable in a transient state in which the rotation speed of the engine increases, the hydraulic controllability of the frictional engagement elements decreases.

The disclosure is made in consideration of such circumstances. According to the controller, when the frictional engagement element taking charge of the rotation control in the gear shift which is a downshift is the same as the frictional engagement element having taken charge of the rotation control in the previous gear shift or the frictional engagement element of which the engagement has been switched in the previous gear shift, it is determined that there is a likelihood of an influence of the hydraulic control of the frictional engagement elements in the previous gear shift and the start of the gear shift is delayed.

By delaying the start of the gear shift in this way, the influence of the hydraulic control of the frictional engagement elements in the previous gear shift is not likely to be applied and the gear shift can be started after the transmission input shaft torque is stabilized. Accordingly, it is possible to secure the hydraulic controllability of the frictional engagement elements.

In the controller for a vehicle, the delay time by which the start of the gear shift is delayed is set depending on the accelerator depression amount. Accordingly, when there is a low likelihood that the transmission input shaft torque (which corresponds to the accelerator depression amount) in the downshift is small and the hydraulic controllability will be unstable, it is possible to perform the gear shift which is a downshift without unnecessary waiting and to minimize a decrease in drivability due to hesitation, by setting the delay time to be shorter.

According to the above-mentioned controller for a vehicle according to the disclosure, it is possible to minimize a decrease in drivability due to hesitation while securing hydraulic controllability of frictional engagement elements at the time of a downshift.

Here, when the frictional engagement element taking charge of the rotation control in the gear shift which is a downshift is the same as the frictional engagement element having taken charge of the rotation control in the previous gear shift or the frictional engagement element of which the engagement has been switched in the previous gear shift, there is a likelihood that the thermal load of the friction material of the frictional engagement element will increase, but the thermal load of the friction material of the frictional engagement element can be decreased by delaying the start of the gear shift.

According to the above-mentioned controller for a vehicle according to the disclosure, it is possible to minimize a decrease in drivability due to hesitation while securing hydraulic controllability of frictional engagement elements at the time of a downshift of a transmission in a vehicle including a transmission including a plurality of frictional engagement elements.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table illustrating engagement states of first to fourth clutches, a first brake, and a second brake for each shift stage in the automatic transmission;

FIG. 7 is a timing chart illustrating an example of control at the time of a downshift in the related art.

DETAILED DESCRIPTION OF EMBODIMENTS

Hereinafter, embodiments of the disclosure will be described with reference to the accompanying drawings. First, a vehicle 100 according to an embodiment will be described below with reference to FIGS. 1 to 4.

Figure 1:
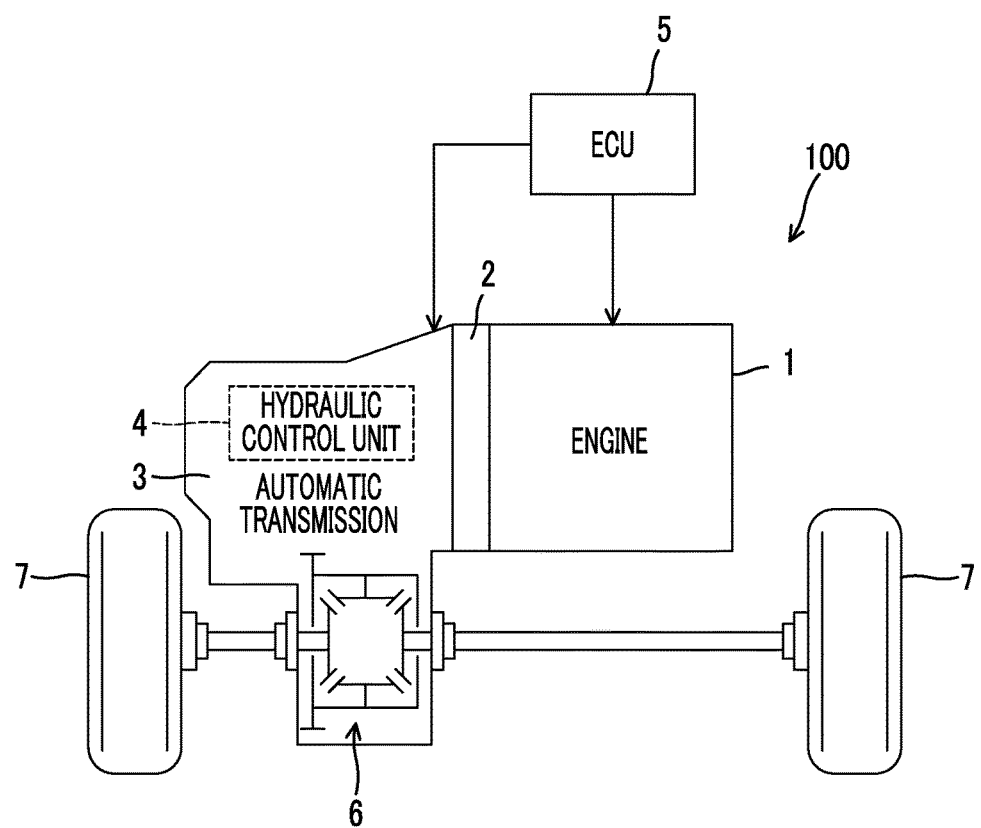
FIG. 1 is a diagram schematically illustrating a configuration of a vehicle to which the disclosure is applied.

As illustrated in FIG. 1, the vehicle 100 includes an engine 1, a torque converter 2, an automatic transmission 3, a hydraulic control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
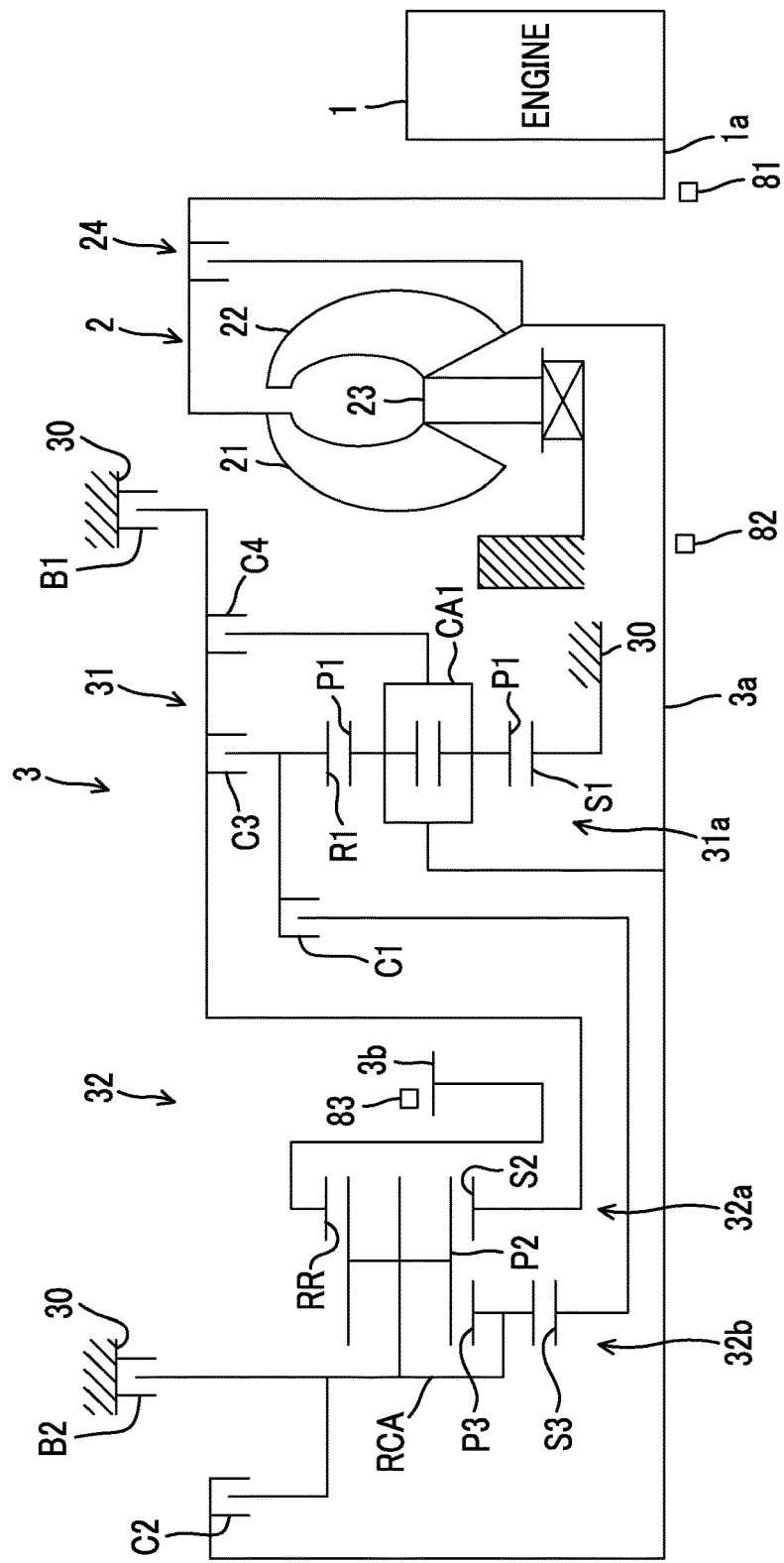
FIG. 2 is a skeleton diagram illustrating a configuration of a torque converter and the automatic transmission illustrated in FIG. 1.

As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as main elements, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member, reduces the rotation speed of the input shaft 3a, and transmits the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that are frictionally engaged by hydraulic actuators and are controlled by the hydraulic control unit 4 and the ECU 5.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this embodiment, the first clutch C1 and the second brake B2 each engage to set a first shift stage (1st) having a largest gear ratio (the rotation speed of the input shaft 3a/the rotation speed of the output shaft 3b). The first clutch C1 and the first brake B1 each engage to set a second shift stage (2nd).

The first clutch C1 and the third clutch C3 each engage to set a third shift stage (3rd). The first clutch C1 and the fourth clutch C4 each engage to set a fourth shift stage (4th).

The first clutch C1 and the second clutch C2 each engage to set a fifth shift stage (5th). The second clutch C2 and the fourth clutch C4 each engage to set a sixth shift stage (6th).

The second clutch C2 and the third clutch C3 each engage to set a seventh shift stage (7th). The second clutch C2 and the first brake B1 each engage to set an eighth shift stage (8th). The third clutch C3 and the second brake B2 each engage to set a reverse shift stage (Rev).

In this embodiment, the forward shift stages (1st to 8th) are set in a clutch-to-clutch manner.

The hydraulic control unit 4 controls engagement and disengagement of a plurality of frictional engagement elements (the clutches C1 to C4 and the brakes B1 and B2) of the automatic transmission 3. The hydraulic control unit 4 also has a function of controlling the lock-up clutch 24 of the torque converter 2. The hydraulic control unit 4 includes a hydraulic actuator of each frictional engagement element of the automatic transmission 3 and a linear solenoid valve that supplies a controlled hydraulic pressure to the hydraulic actuators.

Figure 4:
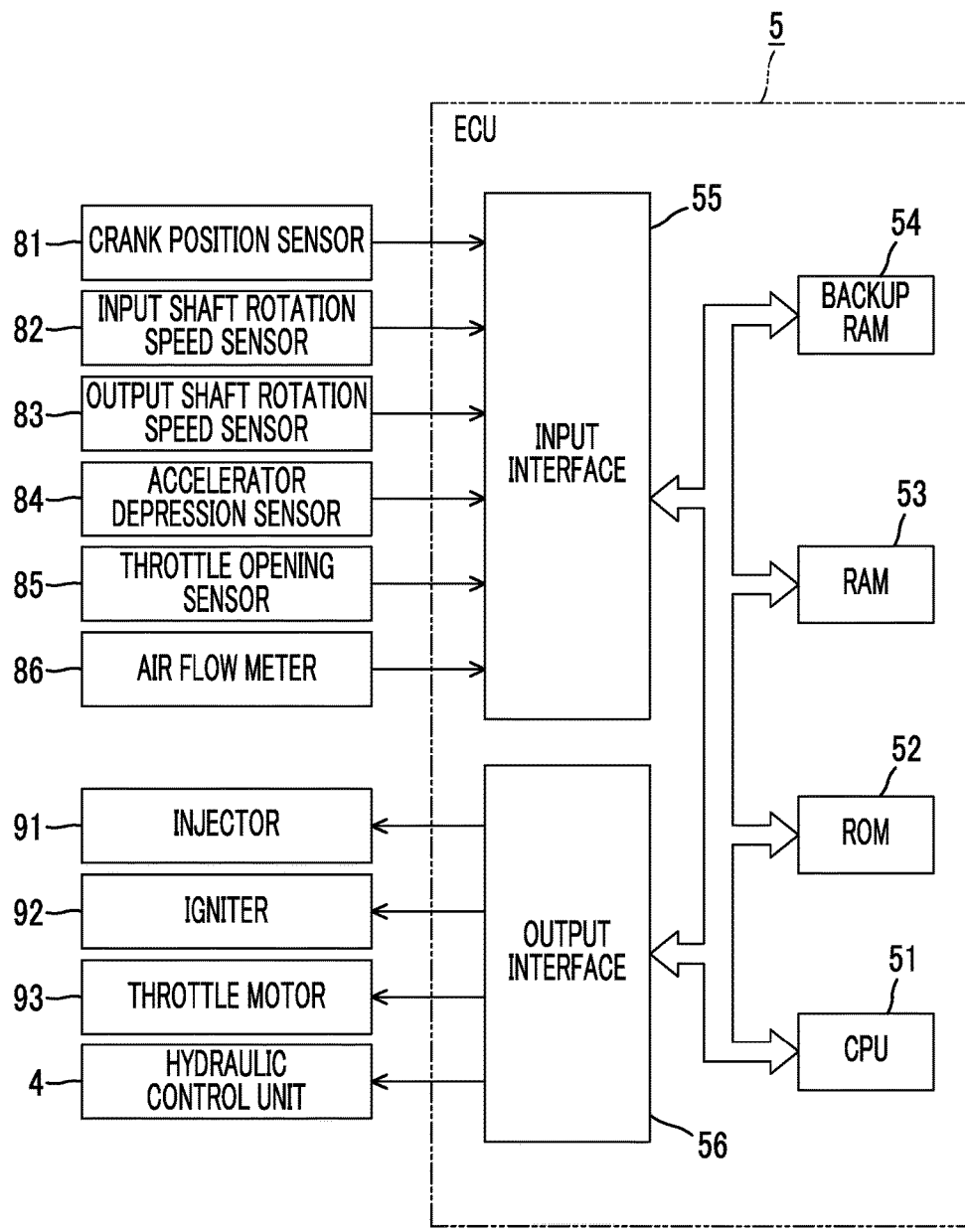
FIG. 4 is a block diagram illustrating a configuration of a control system of the vehicle.

The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56. The ECU 5 is an example of the "electronic control unit" in the claims.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator depression sensor 84, a throttle opening sensor 85, an air flow meter 86, and the like.

The crank position sensor 81 is provided to calculate a rotation speed of the engine 1. The input shaft rotation speed sensor 82 is provided to calculate a rotation speed of the input shaft 3a (an input shaft rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator depression sensor 84 is provided to detect an accelerator depression amount which is a depression amount (an operation amount) of an accelerator pedal. The throttle opening sensor 85 is provided to detect a throttle opening level of a throttle valve. The air flow meter 86 is provided to detect an amount of intake air of the engine 1.

The output interface 56 is connected to an injector 91, an igniter 92, a throttle motor 93, the hydraulic control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, and the ignition timing, and the like based on the detection results of various sensors. The ECU 5 is configured to perform gear shift control of the automatic transmission 3 and control of the lock-up clutch 24 of the torque converter 2 by controlling the hydraulic control unit 4.

In the gear shift control by the ECU 5, a required shift stage is set, for example, based on a gear shift map with the vehicle speed and the accelerator depression amount as parameters, and the hydraulic control unit 4 is controlled such that an actual shift stage is the required shift stage. The gear shift map is a map in which a plurality of areas for calculating an appropriate shift stage (one of the 1st to 8th shift stages having optimal efficiency) are set depending on the vehicle speed and the accelerator depression amount, and is stored in the ROM 52 of the ECU 5. A plurality of shift lines for defining the areas (upshift lines and downshift lines for defining the shift areas of the 1st to 8th shift stages) are set in the gear shift map.

The ECU 5 performs a process of calculating an input shaft torque which is transmitted from the engine 1 to the input shaft 3a of the automatic transmission 3, a process of storing a status of a frictional engagement element (hereinafter also referred to as a clutch), and downshift control.

The process of calculating an input shaft torque will be described below. The ECU 5 calculates an engine torque from a preset map or a preset calculating expression, for example, based on an amount of intake air acquired from an output signal of the air flow meter 86 and an ignition timing of the engine 1 and calculates the input shaft torque by multiplying the calculated engine torque by a torque ratio of the torque converter 2.

In a driven area, an influence of an engine friction or an auxiliary unit load on a torque generated from the engine 1 is large and calculation accuracy of the input shaft torque based on the amount of intake air is likely to degrade. Therefore, in a driven area, the engine torque is calculated from a preset map or a preset calculating expression based on the engine rotation speed acquired from the output signal of the crank position sensor 81, and the input shaft torque is calculated by multiplying the calculated engine torque by the torque ratio of the torque converter 2.

Regarding the input shaft torque, a torque sensor may be disposed in the crank shaft 1a of the engine 1 or the input shaft 3a of the automatic transmission 3 and the input shaft torque may be calculated based on the output signal of the torque sensor.

The process of storing a clutch status which is performed by the ECU 5 will be described below. First, when a clutch-to-clutch gear shift is executed in a normal gear shift of the automatic transmission 3, the clutches are classified as a clutch maintaining an engaged state, an engagement-side clutch, a disengagement-side clutch, and a non-controlled clutch.

Regarding the engagement-side clutch and the disengagement-side clutch, a clutch taking charge of rotation control (a rotation control clutch) at the time of a gear shift is classified as an engagement-side clutch or a disengagement-side clutch depending on whether the gear shift of the automatic transmission 3 is a gear shift mode of an upshift or a downshift and whether the input shaft torque of the automatic transmission 3 is in a driving state or a driven state. Specifically, when the gear shift is a driving upshift or a driven downshift, the clutch taking charge of the rotation control in the gear shift is the engagement-side clutch. When the gear shift is a driven upshift or a driving downshift, the clutch taking charge of the rotation control in the gear shift is the disengagement-side clutch.

The ECU 5 classifies and stores the clutches (which include non-used clutches) which are used for each gear shift (each clutch-to-clutch gear shift) of the automatic transmission 3. Specifically, the clutches are classified as a clutch maintaining the engaged state, a clutch taking charge of the rotation control, a clutches of which the engagement has been switched, and non-used clutches and are stored (for example, which are stored in the RAM 53). The engagement-side clutch is stored as the clutch taking charge of the rotation control when the gear shift of the automatic transmission 3 is a driving upshift or a driven downshift, and the disengagement-side clutch is stored as the clutch taking charge of the rotation control when the gear shift is a driven upshift or a driving downshift.

An example of downshift control which is performed by the ECU 5 will be described below. First, downshift control based on accelerator depression in the related art (hereinafter referred to as control in the related art) will be described with reference to FIG. 7.

FIG. 7 is a timing chart illustrating changes in an input shaft rotation speed, an input shaft torque, a clutch hydraulic command, and a vehicle front-rear acceleration at the time of a downshift based on accelerator depression.

In the control in the related art, since a gear shift which is a downshift is started under an influence of clutch hydraulic control in the previous gear shift (see part b3 in FIG. 7) and in a state in which the input shaft torque is unstable due to accelerator depression (see part b2 in FIG. 7), clutch hydraulic controllability in the gear shift decreases. Accordingly, a shock (see part b4 in FIG. 7) or a blowout in the input shaft torque (an engine torque) (see part b1 in FIG. 7) occurs.

This embodiment is made in consideration of such a problem and realizes control that can secure clutch hydraulic controllability and minimize a decrease in drivability due to hesitation at the time of a downshift.

Figure 5:
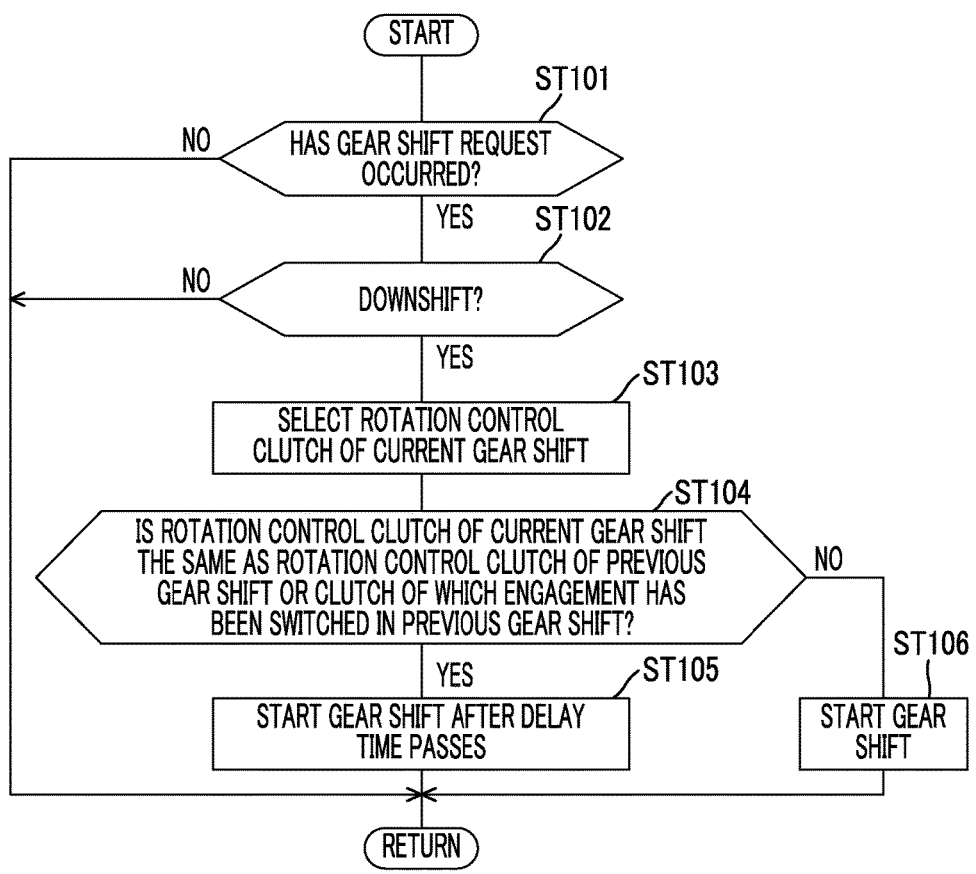
FIG. 5 is a flowchart illustrating an example of control at the time of a downshift of the automatic transmission.

An example of the control (downshift control) will be described below with reference to the flowchart illustrated in FIG. 5. The control routine illustrated in FIG. 5 is repeatedly performed at predetermined intervals by the ECU 5. When the control routine illustrated in FIG. 5 starts, it is determined in Step ST101 whether a gear shift request of the automatic transmission 3 has occurred based on the vehicle speed acquired from the output signal of the output shaft rotation speed sensor 83, the accelerator depression amount acquired from the output signal of the accelerator depression sensor 84, and the gear shift map.

When the determination result of Step ST101 is negative (NO), the control routine restarts. When the determination result of Step ST101 is positive (YES), the control routine transitions to Step ST102.

In Step ST102, it is determined whether the gear shift request is a downshift request. When the determination result thereof is negative (NO), the control routine restarts. When the determination result of Step ST102 is positive (YES) (when the gear shift request is a downshift request), the control routine transitions to Step ST103.

In Step ST103, the clutch taking charge of the rotation control in the current gear shift (the downshift) is selected. Specifically, when the input shaft torque (which is calculated in the above-mentioned calculation process) is in a driving state (when the input shaft torque has a positive value), the gear shift is the driving downshift and thus the disengagement-side clutch which is used for the current gear shift (the clutch-to-clutch gear shift) is selected as the clutch taking charge of the rotation control (the rotation control clutch of the current gear shift). When the input shaft torque is in a driven state (when the input shaft torque has a negative value), the gear shift is a driven downshift and thus the engagement-side clutch which is used for the current gear shift is selected as the clutch taking charge of the rotation control (the rotation control clutch of the current gear shift).

In Step ST104, it is determined whether the rotation control clutch of the current gear shift selected in Step ST103 is the same as the clutch having taken charge of the rotation control in the previous gear shift (the rotation control clutch of the previous gear shift) or the clutch of which the engagement has been switched in the previous gear shift.

When the determination result of Step ST104 is negative (NO), that is, when the rotation control clutch of the current gear shift is not the same as the rotation control clutch of the previous gear shift or the clutch of which the engagement has been switched in the previous gear shift, it is determined that hydraulic controllability of the rotation control clutch of the current gear shift can be secured, and the gear shift is immediately started (Step ST106).

On the other hand, when the determination result of Step ST104 is positive (YES), that is, when the rotation control clutch of the current gear shift is the same as the rotation control clutch of the previous gear shift or the clutch of which the engagement has been switched in the previous gear shift, it is determined that there is a likelihood that the hydraulic controllability of the rotation control clutch of the current gear shift will decrease, and the control routine transitions to Step ST105.

An example in which the rotation control clutch of the current gear shift is the same as the rotation control clutch of the previous gear shift will be described below with reference to FIG. 3. For example, when the previous gear shift is a driving upshift from the fourth shift stage to the sixth shift stage (4th→6th), the second clutch C2 serves as the engagement-side clutch in the clutch-to-clutch gear shift and the second clutch C2 serves as the rotation control clutch of the previous gear shift. When the current gear shift is a driving downshift from the sixth shift stage to the fourth shift stage (6th→4th), the second clutch C2 serves as the disengagement-side clutch in the clutch-to-clutch gear shift and the second clutch C2 serves as the rotation control clutch of the current gear shift. Accordingly, the rotation control clutch of the current gear shift is the same as the rotation control clutch of the previous gear shift.

An example in which the rotation control clutch of the current gear shift is the same as the clutch of which the engagement has been switched in the previous gear shift will be described below with reference to FIG. 3. For example, when the previous gear shift is a driving upshift from the third shift stage to the fifth shift stage (3rd→5th), the second clutch C2 serves as the clutch of which the engagement has been switched in the clutch-to-clutch gear shift. When the current gear shift is a driving downshift from the fifth shift stage to the fourth shift stage (5th→4th), the second clutch C2 serves as the disengagement-side clutch in the clutch-to-clutch gear shift and the second clutch C2 serves as the rotation control clutch of the current gear shift. Accordingly, the rotation control clutch of the current gear shift is the same as the clutch of which the engagement has been switched in the previous gear shift.

In Step ST105, the gear shift is started after a predetermined delay time passes from a time point at which the gear shift request occurs (a time point at which YES is determined in Step ST101).

The delay time which is used in the process of Step ST105 is set depending on an accelerator depression amount. Specifically, for example, the delay time is set with reference to a delay time map using the accelerator depression amount which is acquired from the output signal of the accelerator depression sensor 84.

The delay time map is a map in which the accelerator depression amount is used as a parameter and the delay time is set in advance by experiment or simulation in consideration of a point that a transient change of the engine torque (the input shaft torque) is small and the likelihood that the clutch hydraulic controllability decreases is lowered when the accelerator depression amount is small, and is stored in the ROM 52 of the ECU 5. In the delay time map, the delay time is set to be shorter as the accelerator depression amount becomes smaller.

The "controller for a vehicle" in the claims is embodied by causing the ECU 5 to perform the processes of Steps ST101 to ST106 in FIG. 5.

Figure 6:
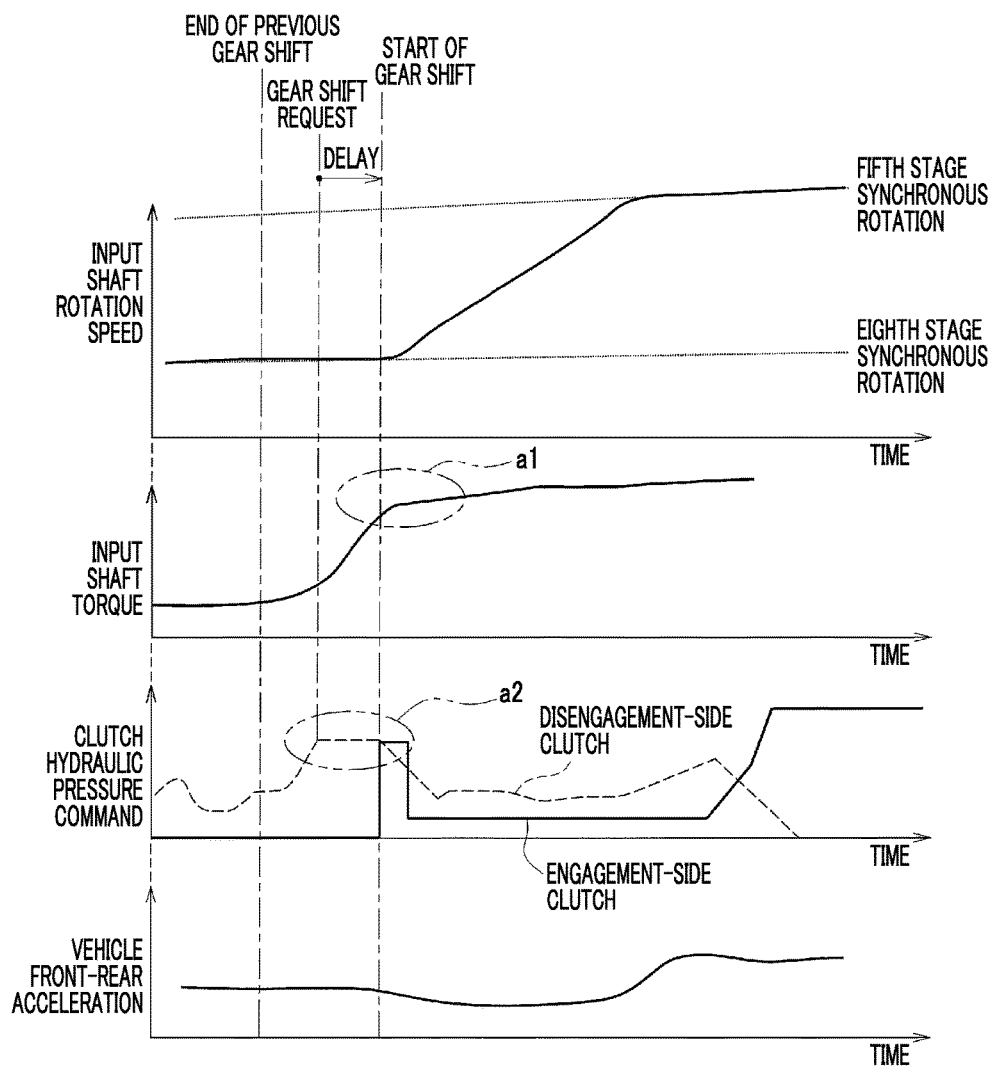
FIG. 6 is a timing chart illustrating an example of the control at the time of a downshift of the automatic transmission.

A specific example of the downshift control due to accelerator depression will be described below with reference to FIG. 6. FIG. 6 is a timing chart illustrating changes in an input shaft rotation speed, an input shaft torque, a clutch hydraulic command, and a vehicle front-rear acceleration at the time of a downshift based on accelerator depression.

In this control example, start of the gear shift is delayed until the clutch hydraulic control of the previous gear shift is stabilized (see part a2 in FIG. 6) and the input shaft torque is stabilized (see part a1 in FIG. 6) after a gear shift request occurs. In this way, by delaying the start of the gear shift which is a downshift, it is possible to secure clutch hydraulic controllability and to prevent occurrence of a shock or occurrence of a blowout of the input shaft rotation speed (the engine rotation speed).

According to this embodiment, when the gear shift of the automatic transmission 3 is a downshift and the clutch taking charge of the rotation control in the downshift is the same as the clutch having taken charge of the rotation control in the previous gear shift or the clutch of which the engagement has been switched in the previous gear shift, it is determined that there is a likelihood that an influence of the clutch hydraulic control in the previous gear shift will be applied and the start of the gear shift is delayed. By delaying the start of the gear shift in this way, the influence of the hydraulic control of the frictional engagement elements in the previous gear shift is not likely to be applied and the gear shift can be started after the input shaft torque is stabilized, thereby securing the hydraulic controllability of the frictional engagement elements.

The delay time by which the start of the gear shift is delayed is set depending on the accelerator depression amount such that the delay time becomes shorter when there is a low likelihood that the accelerator depression amount is small and stability of the hydraulic controllability decreases. Accordingly, it is possible to appropriately set the delay time and to execute a gear shift which is a downshift without unnecessary waiting. As a result, it is possible to minimize a decrease in drivability due to hesitation.

As described above, according to this embodiment, it is possible to minimize a decrease in drivability due to hesitation while securing clutch hydraulic controllability at the time of a downshift.

In this embodiment, since a thermal load on clutch friction materials can be reduced by delaying the start of a gear shift which is a downshift, it is possible to suppress a decrease in durability of the clutch friction materials.

The above-disclosed embodiment is exemplary in all respects and does not serve as a basis of restrictive analysis. Accordingly, the technical scope of the disclosure is not construed by only the above-mentioned embodiment, but is defined by the description of the appended claims. The technical scope of the disclosure includes all modifications within a meaning and a range equivalent to the claims.

The above-mentioned embodiment describes an example in which the disclosure is applied to the control of the automatic transmission 3 of the vehicle 100 with eight forward stages. However, the disclosure is not limited thereto and the disclosure can be applied to control of an automatic transmission with seven or less forward stages or nine or more forward stages.

The above-mentioned embodiment describes an example in which the vehicle 100 is of an FF type. However, the disclosure is not limited thereto and the vehicle may be of a front engine-rear drive (FR) type or of a four-wheel driven type.

The above-mentioned embodiment describes an example in which the engine 1 is a multi-cylinder gasoline engine, but the disclosure is not limited thereto. The engine may be a diesel engine or the like.

In the above-mentioned embodiment, the ECU 5 may be constituted by a plurality of ECUs.

The disclosure can be usefully used for control of a vehicle including an engine and a stepped type transmission.

What is claimed is:

1. A controller for a vehicle, the vehicle including an engine and a stepped transmission having a plurality of frictional engagement elements and which executes a gear shift operation between a plurality of shift stages by selectively switching an engagement state of each of the plurality of frictional engagement elements between an engaged state and a disengaged state, the controller comprising:
   an electronic control unit configured to: when the gear shift operation is a downshift and a rotation-control frictional engagement element, which is one of the plurality of frictional engagement elements that is designated to take charge of rotation control in the downshift, was designated as the rotation-control frictional engagement element in an immediately previous gear shift operation or had its engagement state switched in the immediately previous gear shift operation,
   (i) set a predetermined delay time depending on an accelerator depression amount; and (ii) start the gear shift operation after the predetermined delay time elapses after a gear shift start request of the downshift.

2. The controller according to claim 1, wherein
the electronic control unit is configured to decrease a duration of the predetermined delay time as a torque to an input shaft of the transmission during the downshift decreases.

3. The controller according to claim 1, wherein
the electronic control unit is configured to, when the gear shift operation is the downshift and the rotation-control frictional engagement element designated for the gear shift operation was not designated as the rotation-control frictional engagement element in the immediately previous gear shift operation and did not have its engagement state switched in the immediately previous gear shift operation, start the gear shift operation immediately without any delay time from the gear shift start request for the downshift.

* * * * *